United States Patent
Frederick et al.

(10) Patent No.: US 10,272,825 B2
(45) Date of Patent: Apr. 30, 2019

(54) SYSTEMS, VEHICLES, AND METHODS FOR ADJUSTING LIGHTING OF A TOWING HITCH REGION OF A VEHICLE

(71) Applicant: Toyota Motor Engineering & Manufacturing North America, Inc., Erlanger, KY (US)

(72) Inventors: Scott L. Frederick, Brighton, MI (US); Ryan C. Harris, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 77 days.

(21) Appl. No.: 15/399,376

(22) Filed: Jan. 5, 2017

(65) Prior Publication Data

US 2018/0191937 A1 Jul. 5, 2018

(51) Int. Cl.
| | |
|---|---|
| B60K 35/00 | (2006.01) |
| B60R 1/00 | (2006.01) |
| B60Q 1/56 | (2006.01) |
| B60D 1/36 | (2006.01) |
| H04N 5/247 | (2006.01) |
| B60D 1/06 | (2006.01) |
| H04N 7/18 | (2006.01) |
| B60R 11/04 | (2006.01) |

(Continued)

(52) U.S. Cl.
CPC ............. *B60Q 1/2619* (2013.01); *B60D 1/36* (2013.01); *B60D 1/62* (2013.01); *B60K 35/00* (2013.01); *B60Q 1/245* (2013.01); *B60Q 1/2607* (2013.01); *B60Q 1/56* (2013.01); *B60R 1/00* (2013.01); *H04N 5/2256* (2013.01); *H04N 5/247* (2013.01); *H04N 7/183* (2013.01); *B60K 2350/106* (2013.01); *B60K 2350/1028* (2013.01); *B60K 2350/1088* (2013.01); *B60K 2350/2013* (2013.01); *B60R 2300/103* (2013.01); *B60R 2300/808* (2013.01); *B60Y 2400/92* (2013.01)

(58) Field of Classification Search
None
See application file for complete search history.

(56) References Cited

U.S. PATENT DOCUMENTS

| | | | |
|---|---|---|---|
| 5,245,694 A * | 9/1993 | Zwern | B60R 16/0373 704/200 |
| 6,012,828 A | 1/2000 | Pearce et al. | |

(Continued)

FOREIGN PATENT DOCUMENTS

| | | |
|---|---|---|
| EP | 2813752 A1 | 12/2014 |
| JP | H091231327 A | 5/1997 |

*Primary Examiner* — Reza Aghevli
(74) *Attorney, Agent, or Firm* — Dinsmore & Shohl LLP

(57) ABSTRACT

A system for adjusting lighting of a towing hitch region of a vehicle includes processor, user input device communicatively coupled to the processor, and light source comprising actuator communicatively coupled to the processor. The light source are configured to selectively illuminate the towing hitch region of the vehicle. The system further includes memory module communicatively coupled to the processor that stores logic that, when executed by the processor, cause the system to receive user instructions from the user input device; and adjust an angle of illumination of the light source with the actuator to illuminate the towing hitch region based on the user instructions.

20 Claims, 5 Drawing Sheets

(51) Int. Cl.
  *B60Q 1/26* (2006.01)
  *H04N 5/225* (2006.01)
  *B60Q 1/24* (2006.01)
  *B60D 1/62* (2006.01)

(56) References Cited

U.S. PATENT DOCUMENTS

| | | | |
|---|---|---|---|
| 6,886,968 B1* | 5/2005 | Hamelink | B60D 1/58 |
| | | | 280/163 |
| 7,568,716 B2 | 8/2009 | Dietz | |
| 7,777,615 B2* | 8/2010 | Okuda | B60D 1/36 |
| | | | 280/477 |
| 7,889,230 B2 | 2/2011 | Chen et al. | |
| 8,963,705 B2 | 2/2015 | Miller et al. | |
| 9,688,190 B1* | 6/2017 | Johnson | B60Q 1/56 |
| 9,809,160 B2* | 11/2017 | Salter | B60Q 1/56 |
| 2006/0023461 A1* | 2/2006 | Knight | B60Q 1/076 |
| | | | 362/466 |
| 2007/0216136 A1 | 9/2007 | Dietz | |
| 2010/0129070 A1 | 5/2010 | Balasundaramohan et al. | |
| 2015/0217685 A1* | 8/2015 | Salter | B60Q 1/56 |
| | | | 362/485 |
| 2015/0345938 A1* | 12/2015 | Salter | H05B 37/0218 |
| | | | 116/28 R |
| 2015/0345939 A1* | 12/2015 | Salter | H05B 37/0218 |
| | | | 356/138 |
| 2016/0318438 A1* | 11/2016 | Wadell | B60Q 1/143 |
| 2016/0332562 A1* | 11/2016 | Kim | B60Q 1/0076 |
| 2017/0113599 A1* | 4/2017 | Park | F21S 41/36 |
| 2017/0203684 A1* | 7/2017 | Georgitsis | B60Q 1/0023 |
| 2017/0246985 A1* | 8/2017 | Dellock | B60Q 1/2619 |
| 2018/0029525 A1* | 2/2018 | Park | F21S 41/36 |

* cited by examiner

SYSTEMS, VEHICLES, AND METHODS FOR ADJUSTING LIGHTING OF A TOWING HITCH REGION OF A VEHICLE

TECHNICAL FIELD

The present specification generally relates to systems, vehicles, and methods for adjusting lighting and, more specifically, systems, vehicles, and methods for adjusting lighting of a towing hitch region of a vehicle.

BACKGROUND

Vehicles may be equipped with towing hitches to tow various towable items (e.g., boats, RVS, trailers, etc.). However, often these towable items are attached to the towing hitch of the vehicle during times of day when lighting may not be particularly suited for such endeavors. Poor lighting may make it difficult for vehicle operators to singularly attach the towable items to the vehicle via the towing hitch. Hence, attaching a towable item to a towing hitch of a vehicle is often a two-person job.

Accordingly, a need exists for systems and methods for adjusting lighting of a towing hitch region of vehicle.

SUMMARY

In one embodiment, a system for adjusting lighting of a towing hitch region of a vehicle includes a processor, a user input device communicatively coupled to the processor, and a light source comprising an actuator communicatively coupled to the processor. The light source is configured to selectively illuminate the towing hitch region of the vehicle. The system further includes a memory module communicatively coupled to the processor that stores logic that, when executed by the processor, causes the system to receive user instructions from the user input device; and adjust an angle of illumination of the light source with the actuator to illuminate the towing hitch region based on the user instructions.

In another embodiment, a vehicle for adjusting lighting of a towing hitch region of the vehicle includes a processor, a user input device communicatively coupled to the processor, and a light source coupled to a rear portion of the vehicle and comprising an actuator communicatively coupled to the processor. The light source is configured to selectively illuminate the towing hitch region of the vehicle. The system further includes memory module communicatively coupled to the processor that stores logic that when executed by the processor, causes the system to receive user instructions from the user input device; and adjust a, angle of illumination of the light source with the actuator to illuminate the towing hitch region based on the user instructions.

In yet another embodiment, a method for adjusting lighting of a towing hitch region of a vehicle includes receiving user instructions from a user input device and adjusting an angle of illumination of a light source coupled to a rear portion of the vehicle using an actuator coupled to the light source to illuminate the towing hitch region of the vehicle based on the user instructions received from the user input device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the systems, vehicles and methods for adjusting lighting of a towing hitch region of a vehicle provided herein allows for remote, individual control of a light source at a rear of the vehicle to be adjusted so as to direct an angle of illumination of the light source toward a towing hitch region of the vehicle. Hence, when coupling or decoupling a towable item from a towing hitch of the vehicle, the vehicle operator can cause the light source to be directed toward the towing hitch region for better visibility of and around the towing hitch. In combination with a rear view camera, a single person may both navigate the vehicle to the appropriate position of coupling a towable item and couple to towable item to a towing hitch of the vehicle at any time of day. Furthermore, the light source may be configured to automatically toggle back to an original position (i.e., a driving configuration) when the vehicle is placed in drive.

It is noted that the use of the terms "outboard" and "inboard" are directional in nature and generally refer to opposite directions transverse to the length of a vehicle, i.e. the +x and −x directions. The term "vehicle vertical direction" refers to the z direction. The term "longitudinal direction" generally refers to a direction parallel with a length of the vehicle of the y direction.

Figure 1:
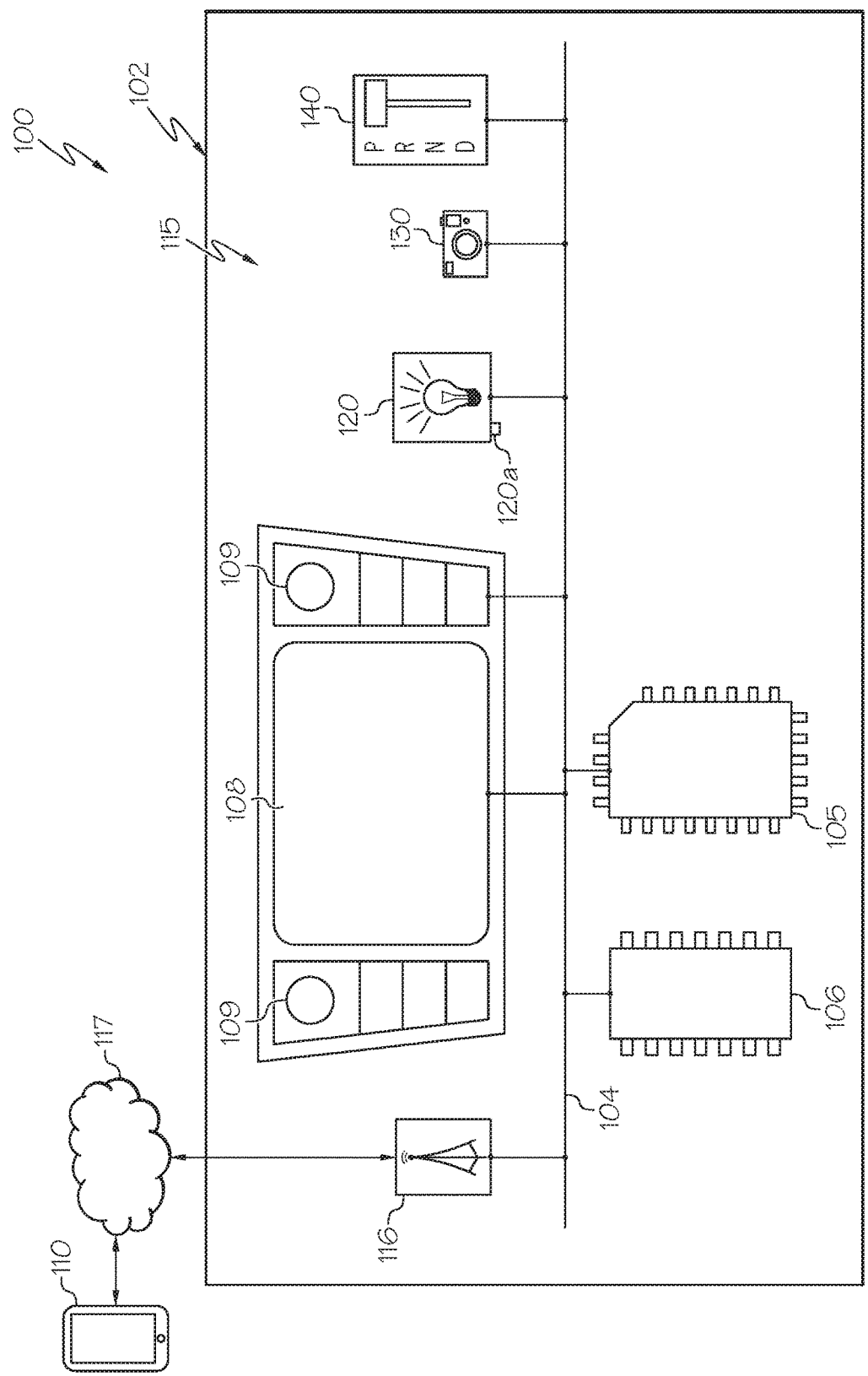
FIG. 1 schematically depicts a system for adjusting lighting of a towing hitch region of a vehicle, according to one or more embodiments shown and described herein.

As used herein the phrase "towable item" refers to any item that may be attached to a vehicle by a towing hitch. This may include, but is not limited to, trailers, campers, boats, and the like Referring now to the drawings, FIG. 1 generally depicts a system 102 of a vehicle 100 for adjusting lighting of a towing hitch region of the vehicle 100. The system 102 includes a communication path 104, a processor 105, a memory module 106, a light source 120, and a user input device 109. The system 102 may further include a rear view camera 130, a display 108, network interface hardware 116, and a drive mode sensor 140. It is noted that, while the vehicle 100 maybe depicted herein as an automobile (e.g., a truck), the vehicle 100 may be any passenger vehicle such as, for example, a terrestrial, aquatic, and/or airborne vehicle.

As described above, the system 102 includes a communication path 104 that provides data interconnectivity between various modules disposed within the system 102. Specifically, each of the modules can operate as a node that may send and/or receive data. In some embodiments, the communication path 104 includes a conductive material that permits the transmission of electrical data signals to processors, memories, sensors, and actuators throughout the system 102. In another embodiment, the communication path 104 can be a bus, such as for example a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The system 102 includes the processor 105 communicatively coupled with the memory module 106 over the communication path 104. The processor 105 may include any device capable of executing machine-readable instructions stored on a non-transitory computer-readable medium. The processor 105 may include one or more processors 105. Accordingly, each processor 105 may include a controller, an integrated circuit, a microchip, a computer, and/or any other computing device.

The memory module 106 is communicatively coupled to the processor 105 over the communication path 104. The memory module 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the system 102 and/or external to the system 102. The memory module 106 may be configured to store one or more pieces of logic, as described in more detail below. The memory module 106 may include one or more memory modules 106. The embodiments described herein may utilize a distributed computing arrangement to perform any portion of the logic described herein.

Embodiments of the present disclosure include logic stored on the memory module 106 that includes machine-readable instructions and/or an algorithm written in any programming language of any generation (e.g., 1GL, 2GL, 3GL, 4GL, and/or 5GL) such as, machine language that may be directly executed by the processor 105, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As noted herein, the system 102 further includes a light source 120. The light source 120 may include a plurality of light sources 120. Each light source 120 is coupled to the communication path 104 and communicatively coupled to the processor 105. Each light source 120 may be any device capable of outputting light, such as but not limited to a light emitting diode, an incandescent light, a fluorescent light, or the like. Each light source 120 may include an actuator 120a configured to interact with the light source 120 to toggle an angle of illumination of the light source 120 to various positions based on instructions received from the user input device 109 as will be described in greater detail herein. Each light source 120 may be individually and separately adjustable.

Figure 2:
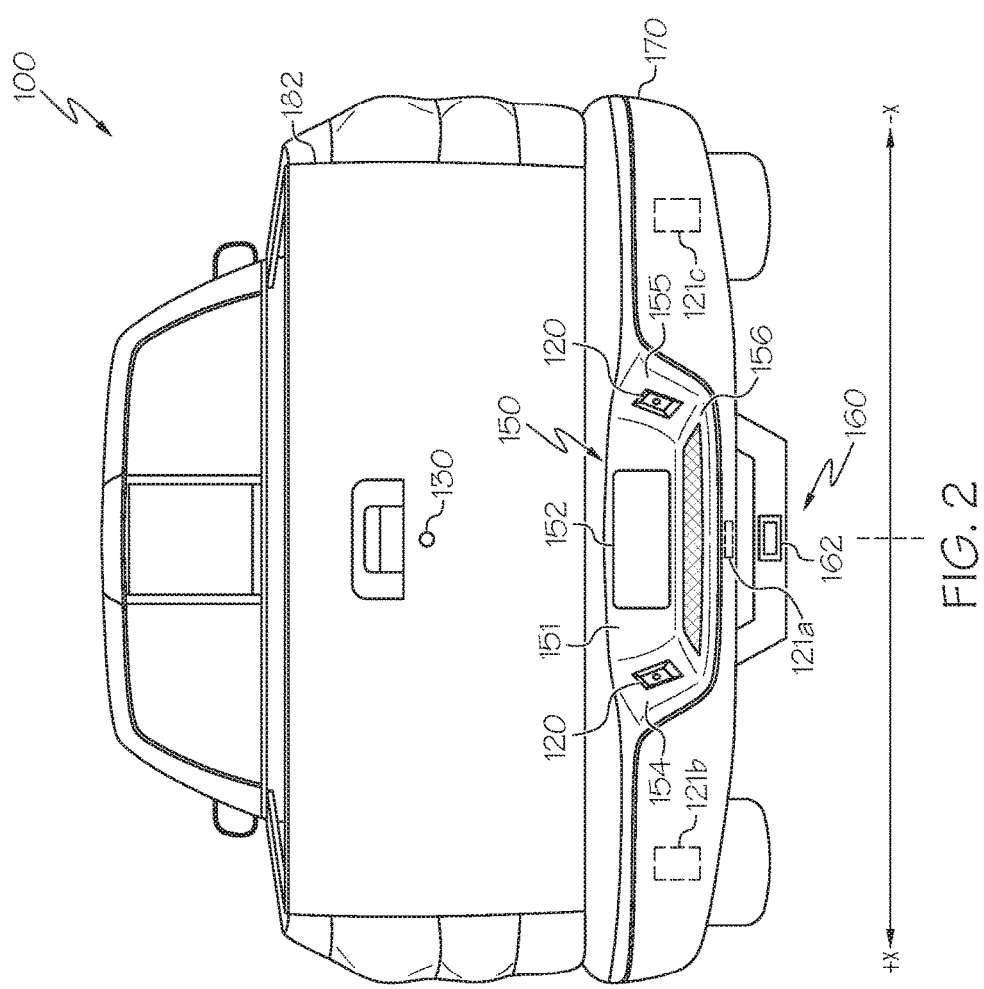
FIG. 2 depicts a rear view of a vehicle comprising one or more lights and a hitch area, according to one or more embodiments shown and described herein.

Referring now to FIG. 2, a rear of the vehicle 100 is depicted. The vehicle 100 includes a bumper 170 extending across the rear of the vehicle 100. The bumper 170 may include a designated license plate region 150 sunken into the bumper 170. The license plate region 150 may include a license plate mounting wall 151, side walls 154, 155 positioned to either side of the license plate mounting wall 151, and a base wall section 156. Each light source 120 may be positioned within a socket 172 and coupled to the side walls 154, 155 of the license plate region 150. In some jurisdictions, laws and/or regulations may require lights that illuminate the license plate 152 of the vehicle 100 during evening hours or periods of poor visibility. As such, in embodiments wherein the light sources 120 are positioned around the license plate 152, each light source 120 may comprise a driving configuration in which the light source 120 has an angle of illumination directed toward the license plate 152 of the vehicle 100. However, it is contemplated that the light source 120 may be positioned at various locations within the license plate region 150 and/or the bumper 170. For example, reference numbers 121a, 121b, and 121c indicate other positions at which the light source 120 may be mounted. In such embodiments, a driving configuration of the light source 120 (e.g., 121a, 121b, 121c) may be parallel to a longitudinal direction (y) of the vehicle 100 (see FIG. 3).

Figure 3:
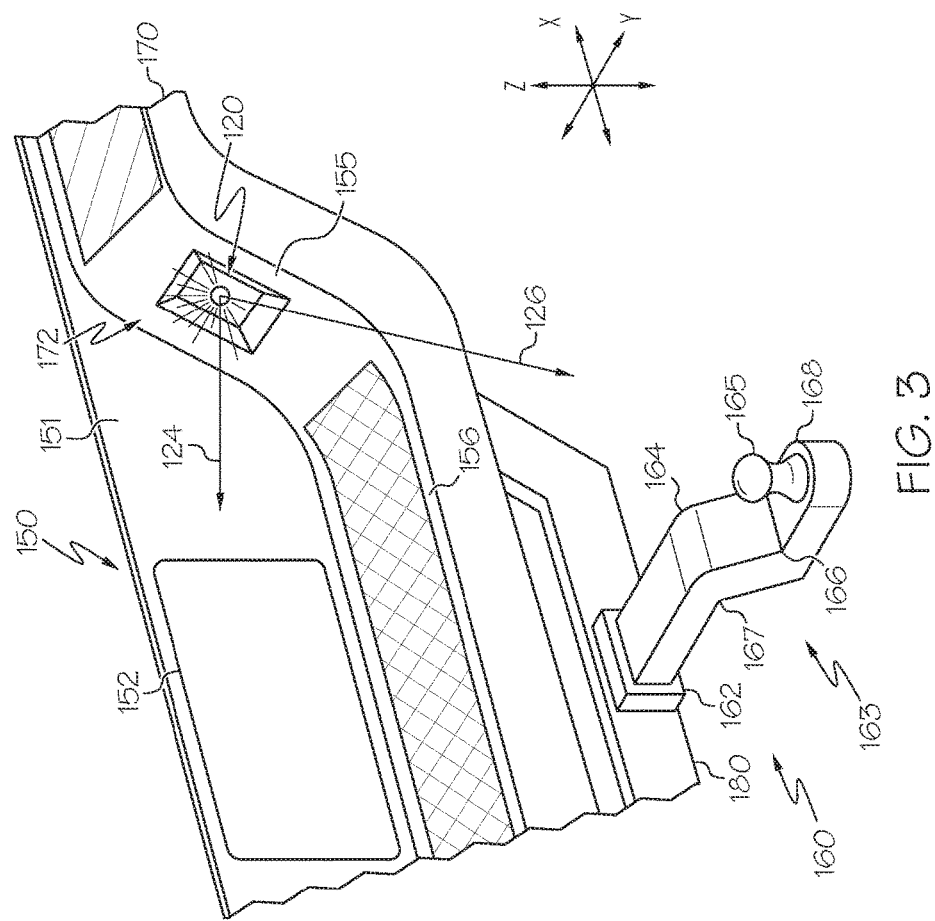
FIG. 3 schematically depicts a perspective view of the towing hitch region of FIG. 2, according to one or more embodiments shown and described herein.

Referring now to FIG. 3, a partial view of the bumper 170 including the license plate region 150 and the towing hitch region 160 is depicted. The light source 120 is illustrated as coupled to the socket 172 sunken into the sidewall 155 of the license plate region 150. The light source 120 may be toggled, by the actuator 120a (schematically illustrated in FIG. 1), to a variety of positions to change an angle of illumination of the light source 120 in accordance with instructions received from the user input devices 109. In this embodiment the light source 120 has a driving configuration in which an angle of illumination of the light source 120 is directed toward the license plate 152 generally in the vehicle lateral direction, x. The light source 120 may be toggled away from a direction 124 angled toward the license plate 152 to a direction 126 angled toward a towing hitch region 160 of the vehicle 100 generally in the vehicle longitudinal direction, y.

The towing hitch region 160 generally refers to a position of the towing hitch 163 when coupled to the vehicle 100. Still referring to FIG. 3, the towing hitch 163 is mounted to a frame 180 of the vehicle 100 through a towing hitch receiving tube 162 coupled to the frame 180 of the vehicle 100. The towing hitch 163 comprises an elongate frame 164 that is insertable into the towing hitch receiving tube 162 and may be removably secured thereto through such means as a fastener or pin. The elongate frame 164 may comprise multiple bends 166, 167 that lead to a platform 168 on which a towing hitch ball 165 is coupled to the elongate frame 164. The towing hitch ball 165 may be coupled to the elongate frame 164 through a variety of methods including welding, fastening, and the like. In some embodiments, the towing hitch ball 165 may be interchangeable with other sized and shaped towing hitch balls. It is noted that though the towing hitch 163 illustrated in FIG. 3 is shown to have a particular shape, towing hitches 163 generally may comprise a variety of shapes. For example, though the towing hitch 163 of FIG. 3 includes a step down from a height of the towing hitch receiving tube 162, the towing hitch 163 could instead step up from a height of the towing hitch receiving tube 162. Hence, the angle of illumination may be adjustable to provide adequate lighting to a variety of towing hitch 163 shapes that may be coupled to the vehicle 100.

Figure 4:
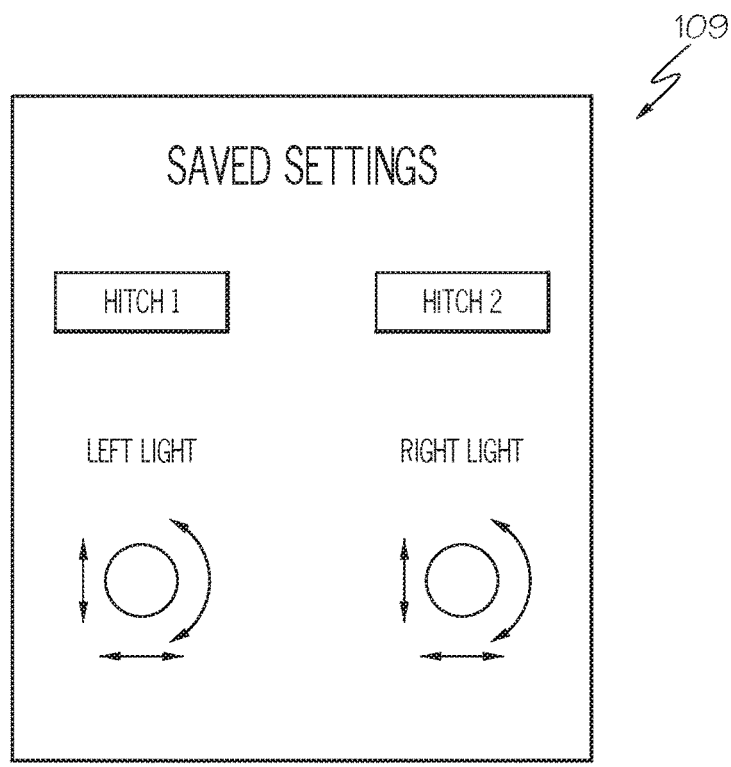
FIG. 4 schematically depicts a user input device of the system of FIG. 1, according to one or more embodiments shown and described herein.

Referring again to FIG. 1, and as noted herein, the system 102 includes the user input device 109 coupled to the communication path 104 such that the communication path 104 communicatively couples the user input device 109 to other modules of the system 102. The user input device 109 may be any device capable of transforming mechanical, optical, or electrical signals into a data signal capable of being transmitted with the communication path 104. Specifically, the user input device 109 may include any number of movable objects that transform physical motion into a data signal that can be transmitted over the communication path 104 such as, for example, a button, a switch, a knob, a microphone or the like. In some embodiments, the display 108 and the user input device 109 are combined as a single module and operate as an audio head unit or an infotainment system within the vehicle 100. However, it is noted, that the display 108 and the user input device 109 may be separate from one another. The user input device 109 may allow a vehicle operator to adjust and the angle of illumination of the light source 120. Referring to FIG. 4, an example of user input device 109 is illustrated. In this illustrated example, the vehicle 100 includes a left light and a right light, the left and right lights refer to the light sources 120 shown in FIG. 2 positioned to either side of the license plate 152. As illustrated in FIG. 4, each of the light sources 120 may have their own set of controls. In other embodiments, the controls may be switchable between the various lights 120. Using the user input device 109, the light sources 120 may be pivoted up/down (z), inboard/output (x), and in the longitudinal direction (y) to allow an angle of illumination of the light to be desirably positioned (e.g., toward the towing hitch region 160 of the vehicle 100). In some embodiments, there may be multiple user input devices 109.

Still referring to FIG. 4, in some embodiments, preferred positions (e.g., hitch 1, hitch 2) may be saved to the memory module 106 for later recall. In this way, a vehicle operator may choose a saved position instead of individually toggling the light source 120 to the desired position each time. It is noted that though only two preferred positions are illustrated, the system 102 may include any number of preferred positions. Furthermore, the preferred positions may have customized labels such as for example, boat hitch, trailer hitch, horse trailer hitch, etc. Such customization may be accomplished through the user input device 109. In some embodiments, a key fob or a mobile device (e.g., portable electronic device), such as a smart phone, may provide a user input device 109 for controlling the position of the light source 120 from outside of the vehicle 100, as described below.

Referring again to FIG. 1, in some embodiments, the system 102 further includes network interface hardware 116 for communicatively coupling the system 102 with a network 117. The network interface hardware 116 can be communicatively coupled to the communication path 104 and can be any device capable of transmitting and/or receiving data via the network 117. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. In another embodiment, network interface hardware 116 may include a Bluetooth send/receive module for sending and receiving Bluetooth communications to/from a mobile device 110.

The system 102 may communicate, through the network interface hardware 116, with a network 117 to communicatively couple the system 102 with the mobile device 110. In one embodiment, the network 117 is a personal area network that utilizes Bluetooth technology to communicatively couple the system 102 and the mobile device 110. In other embodiments, the network 117 may include one or more computer networks (e.g., a personal area network, a local area network, or a wide area network), cellular networks, satellite networks and/or a global positioning system and combinations thereof. Accordingly, the system 102 can be communicatively coupled to the network 117 via wires, via a wide area network 117, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In some embodiments, the mobile device 110 may be included as a user input device 109. The mobile device 110 may include a processor and a memory module 106. The processor can execute logic to communicate with the system 102 in order to facilitate sending instructions to the system 102 from the mobile device 110 to adjust an angle of illumination of the light source 120. The mobile device 110 may be configured with wired and/or wireless communication functionality for communicating with the system 102. In embodiments described herein, the mobile device 110 may include mobile phones, smartphones, personal digital assistants, dedicated mobile media players, mobile personal computers, laptop computers, and/or any other mobile devices capable of being communicatively coupled with the system 102. It is noted, that in this embodiment, the system 102 may communicate with the mobile device 110 even while the mobile device 110 is outside of a cabin of the vehicle 100. In this way, the angle of illumination of the light source 120 may be adjusted with the mobile device 110 from outside of the vehicle 100. For example, a vehicle operator may need to exit the vehicle 100 to finish coupling the towing hitch 163 to the towable item or otherwise service the towable item and may need to further adjust an angle off illumination of the light source 120 to better see the towing hitch region 160.

Referring again to FIG. 1, the system 102 may further include a display 108 for providing visual output such as, for example, maps, navigation, entertainment, information, image data from the rear view camera 130, or a combination thereof. The display 108 is coupled to the communication path 104. Accordingly, the communication path 104 communicatively couples the display 108 to other modules of the system 102. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display 108. Accordingly, the display 108 may receive mechanical input directly upon the optical output provided by the display 108. As such, the display 108 may be included as a user input device 109. Additionally, it is noted that the display 108 can include a processor 105 and a memory module 106.

The system 102 may further include a rear view camera 130 coupled to the communication path 104 such that the communication path 104 communicatively couples the rear view camera 130 to other modules of the system 102. The rear view camera 130 may include any devices having an array of sensing devices (e.g., pixels) capable of capturing image data from an environment of the vehicle 100. The rear view camera 130 may have any resolution. As noted above, image data received from the rear view camera 130 may be displayed on the display 108, for example, during back-up maneuvers. In some embodiments, the system 102 may actuate the rear view camera 130 upon receiving instructions from the user input device 109 that the vehicle 100 is going to be maneuvered to couple a towable item to a towing hitch 163 of the vehicle 100.

Referring also to FIG. 2, the rear view camera 130 may be coupled to a rear of the vehicle 100. In the illustrated embodiments, the rear view camera 130 is coupled to a tailgate 182 of the vehicle 100. However, it is contemplated that the rear view camera 130 may be coupled to other portions of the rear of the vehicles including, but not limited to the bumper 170. The rear view camera 130 is configured to capture image data of an environment of the vehicle 100 to a rear of the vehicle 100. Specifically, the rear view camera 130 may be configured to capture image data that includes at least a portion of the towing hitch 163, said portion including at least the towing hitch ball 165 of the towing hitch 163. As such, from an interior of the vehicle 100, a vehicle operator may see on the display 108 the towing hitch ball 165 and, using the user input device 109, change an angle of illumination of the light source 120 to better see the towing hitch 163.

The system 102 may further include a driving mode sensor 112 communicatively coupled over the communication path 104 to other vehicle modules. The driving mode sensor 112 may be configured to detect a particular driving mode of the vehicle 100. For example, the driving mode sensor 112 may detect whether the vehicle 100 has been placed in a forward driving mode (e.g., drive) and output a driving mode signal regarding the same. In one embodiment, the driving mode sensors 112 may be communicatively coupled with a gear shifter of the vehicle 100 and may output a driving mode signal indicative of the gear in which the vehicle 100 has been placed. The system 102, based on the driving mode of the vehicle 100, may execute logic to automatically return the light source 120 from its adjusted position back to its driving configuration. For example, after a user has adjusted the light source 120 to a position to better see the towing hitch 163, and having attached a towable item to the towing hitch 163 of the vehicle 100, the driver may then place the vehicle 100 in drive so as to drive off with the towable item. In such instances, the system 102, upon determining that the vehicle 100 is in a forward driving gear, may automatically toggle the light source 120 back to its driving configuration (e.g., toward the license plate 152). In further embodiments, the light source 120 may toggle back to its driving configuration a predetermined time after the vehicle 100 has been placed in drive, since it is contemplated that coupling a towable item to a towing hitch 163 may require various vehicle maneuvers including driving slightly forward and reversing. As such, a predetermined time may include about 30 seconds, about 20 seconds, about 10 seconds, and the like. Furthermore, in some embodiments, wherein the system 102 determines that the vehicle 100 is in a drive mode other than for driving forward (e.g., park, reverse, neutral), the system 102 may prompt a user with an opportunity to adjust the light source 120 of the vehicle 100. For example, a prompt may be shown on the display 108 to encourage the vehicle operator to adjust the angle of illumination of the light source 120. In some embodiments, the system 102 may only adjust the angle of illumination of the light source 120 when the vehicle 100 is in a non-forward driving mode (e.g. park, reverse, neutral).

Figure 5:
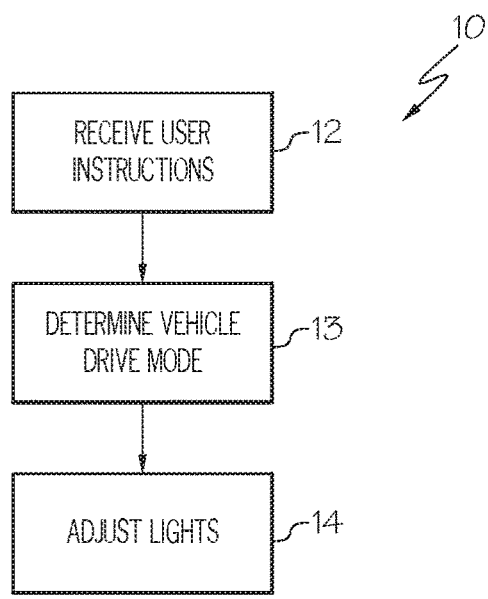
FIG. 5 depicts a method for adjusting one lighting of a towing hitch region of a vehicle, according to one or more embodiments shown and described herein.
Figure 6:
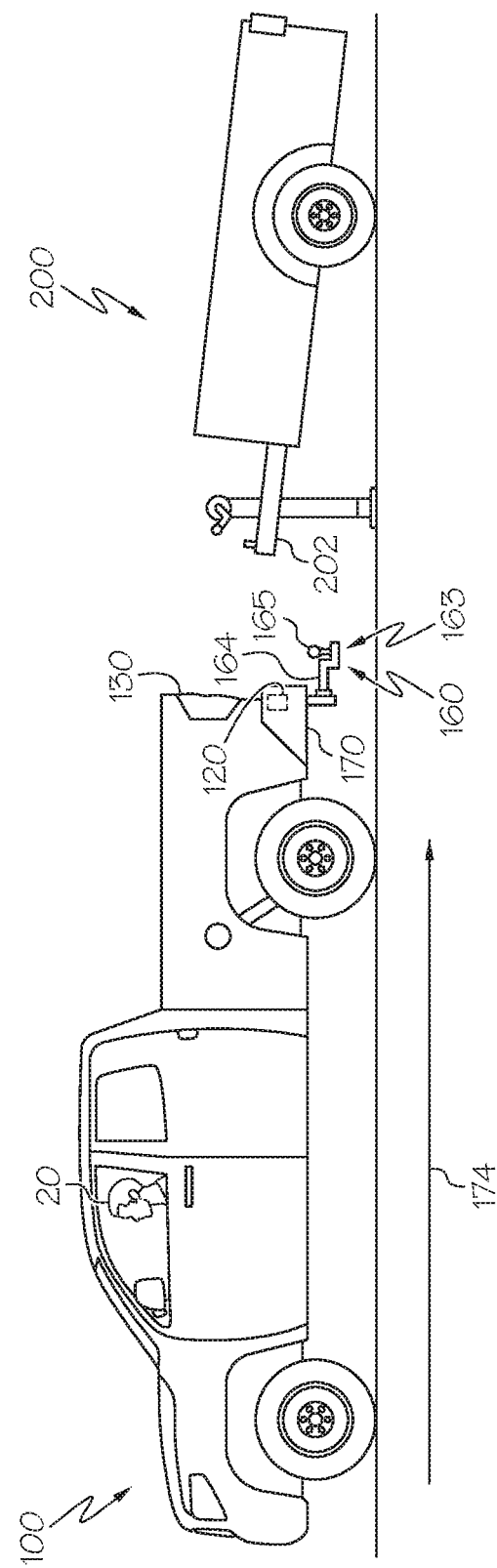
FIG. 6 depicts the vehicle of FIG. 2 that is to be coupled to a towable item via the towing hitch region, according to one or more embodiments shown and described herein.

Referring now to FIG. 5, a method 10 for adjusting lighting of a towing hitch region 160 is generally depicted. The method 10 includes the step of receiving user instructions (block 12). As noted herein above, user instructions may be received from a vehicle operator through a user input device 109. Referring to FIG. 6 the vehicle 100 is shown backing up to a towable item 200 (in this case, a trailer). The towable item has a receiving arm 202 for receiving the towing hitch ball 165 of the towing hitch 163. Once aligned the receiving arm 202 of the towable item 200 may be secured to the towing hitch ball 165. In the illustrated example, the vehicle operator 20 may, using the user input device 109, input instructions into the system 102 as to how the light source 120 is to be adjusted (e.g., left, right, up, down, and around).

The method 10 may further include determining the vehicle drive mode at step 13. As described herein, the system 102 may include a drive mode sensor 140, schematically illustrated in FIG. 1. Based on the drive mode signal output by the drive mode sensor 140, the vehicle 100 may determine whether the vehicle 100 is in a situation in which the vehicle operator 20 may wish to adjust the light source 120. Referring to FIG. 6, arrow 174 indicates that the vehicle 100 is placed in a rearward driving gear (e.g. reverse). As such, the system 102 may prompt the user to adjust the angle of illumination of the light source 120 toward the towing hitch region 160 of the vehicle 100. In some embodiments, there may not be a prompt, but the system 102 may restrict the adjustability of the light source 120 when the vehicle 100 is in a forward driving mode so that the vehicle operator 20 cannot adjust the light source 120 while the vehicle 100 is in the forward driving mode. Furthermore, as noted herein, the system 102, based on the drive mode signal output by the drive mode sensor 140, may determine that the vehicle 100 is in a driving mode and automatically toggle the light source 120 to a predetermined driving configuration, as described herein.

The method 10 further includes the step of adjusting the light source 120 (block 14) based on the instructions provided by the vehicle operator 20 over the user input device 109. As described herein, an actuator 120a may be coupled to the light source 120 that is controllable by the system 102 to adjust the angle of illumination of the light source 120. Hence, the angle of illumination of the light source 120 may be adjusted toward the towing hitch region 160 of the vehicle 100.

It is noted that image data from the rear view camera 130 may be automatically displayed on the display 108 during the above method 10, and specifically while the vehicle operator 20 is inputting instructions to adjust the light source 120 on the user input device 109 (block 12). Hence the vehicle operator 20 may use the image data captured by the rear view camera 130 to aid the vehicle operator 20 in adjusting the light source 120 toward the towing hitch region 160 of the vehicle 100.

It is noted that though the various steps of the method 10 are depicted in an apparent sequential order, the order of steps need not take place as illustrated. For example, and not as a limitation, the step of determining the vehicle drive mode (block 13) may occur before the system 102 receives user instructions (block 13) or vice versa.

It should be now be understood that the systems, vehicles and methods for adjusting lighting of a towing hitch region of a vehicle provided herein allow for remote, individual control of a light source at a rear of a vehicle to be adjusted so as to direct an angle of illumination of the light source toward a towing hitch region of the vehicle. Hence, when coupling or decoupling a towable item from a towing hitch of the vehicle, the vehicle operator can cause the light source to be directed toward the towing hitch region for better visibility. In combination with a rear view camera, a single person may both navigate the vehicle to the appropriate position of coupling a towable item and couple to towable item to a towing hitch of the vehicle at any time of day. Furthermore, the light source may be configured to automatically toggle back to their original position (i.e., a driving configuration) when the vehicle is placed in drive.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for adjusting lighting of a towing hitch region of a vehicle, the system comprising:
   a processor;
   a user input device communicatively coupled to the processor;
   a light source;
   an actuator communicatively coupled to the processor, wherein the actuator selectively adjusts an angle of illumination of the light source to illuminate the towing hitch region of the vehicle; and
   a memory communicatively coupled to the processor that stores logic that, when executed by the processor, causes the system to:
      receive user instructions from the user input device; and
      adjust the angle of illumination of the light source with the actuator to illuminate the towing hitch region based on the user instructions.

2. The system of claim 1, further comprising:
   a rear view camera communicatively coupled to the processor and configured to capture image data of the towing hitch region of the vehicle; and
   a display communicatively coupled to the processor, wherein the logic executed by the processor further causes the system to:
      receive the image data from the rear view camera; and
      display the image data on the display.

3. The system of claim 1, further comprising a drive mode sensor communicatively coupled to the processor and configured to output a drive mode signal, wherein the logic executed by the processor further causes the system to:
   receive the drive mode signal of the drive mode sensor;
   determine a drive mode of the vehicle based on the drive mode signal; and automatically adjust the light source with the actuator to a driving configuration when it is determined that the vehicle is in drive.

4. The system of claim 3, wherein the driving configuration is a configuration in which the light source is directed toward a license plate region of the vehicle.

5. The system of claim 1, wherein the light source is adjustable in at least one of an inboard direction, an outboard direction, and a vehicle vertical direction.

6. The system of claim 1, further comprising network interface hardware communicatively coupled to the processor, wherein the user input device includes a mobile device communicatively coupled to the processor by the network interface hardware.

7. The system of claim 1, wherein the light source includes a plurality of light sources, wherein the angle of illumination of each of the plurality of light sources is configured to be adjusted.

8. A vehicle for adjusting lighting of a towing hitch region of the vehicle, the vehicle comprising:
   a processor;
   a user input device communicatively coupled to the processor;
   a light source coupled to a rear portion of the vehicle;
   an actuator communicatively coupled to the processor, wherein the actuator selectively adjusts an angle of illumination of the light source to illuminate the towing hitch region of the vehicle;
   a memory communicatively coupled to the processor that stores logic that, when executed by the processor, causes the vehicle to:
      receive user instructions from the user input device; and
      adjust the angle of illumination of the light source with the actuator to illuminate the towing hitch region based on the user instructions.

9. The vehicle of claim 8, further comprising:
   a rear view camera communicatively coupled to the processor and configured to capture image data of the towing hitch region of the vehicle; and
   a display communicatively coupled to the processor, wherein the logic executed by the processor further causes the vehicle to:
   receive the image data from the rear view camera; and
   display the image data on the display.

10. The vehicle of claim 8, further comprising a drive mode sensor communicatively coupled to the processor and configured to output a drive mode signal, wherein the logic executed by the processor further causes the vehicle to:
   receive the drive mode signal of the drive mode sensor;
   determine a drive mode of the vehicle based on the drive mode signal; and automatically adjust the light source with the actuator to a driving configuration when it is determined that the vehicle is in drive.

11. The vehicle of claim 10, wherein the driving configuration is a configuration in which the light source is directed toward a license plate region of the vehicle.

12. The vehicle of claim 8, wherein the light source is adjustable in at least one of an inboard direction, an outboard direction, and a vehicle vertical direction.

13. The vehicle of claim 8, further comprising network interface hardware communicatively coupled to the processor, wherein the user input device includes a mobile device communicatively coupled to the processor by the network interface hardware.

14. The vehicle of claim 8, wherein the light source is coupled to a bumper of the vehicle.

15. The vehicle of claim 8, wherein the light source includes a plurality of light sources, wherein the angle of illumination of each of the plurality of light sources is configured to be adjusted.

16. A method for adjusting lighting of a towing hitch region of a vehicle, the method comprising:
receiving user instructions from a user input device; and
adjusting an angle of illumination of a light source coupled to a rear portion of the vehicle with an actuator coupled to the light source to illuminate the towing hitch region of the vehicle based on the user instructions received from the user input device.

17. The method of claim 16, further comprising:
receiving image data from a rear view camera; and
displaying the image data on a display.

18. The method of claim 16, further comprising:
receiving a drive mode signal from a drive mode sensor; and
determining a drive mode of the vehicle based on the drive mode signal;
automatically adjusting the light source with the actuator to a driving configuration when it is determined that the vehicle is in drive.

19. The method of claim 18, wherein the driving configuration is a configuration in which the light source is directed toward a license plate region of the vehicle.

20. The method of claim 16, wherein the angle of illumination of the light source is adjustable in at least one of an inboard direction, an outboard direction, and a vehicle vertical direction.

* * * * *

UNITED STATES PATENT AND TRADEMARK OFFICE
CERTIFICATE OF CORRECTION

| | | |
|---|---|---|
| PATENT NO. | : 10,272,825 B2 | Page 1 of 1 |
| APPLICATION NO. | : 15/399376 | |
| DATED | : April 30, 2019 | |
| INVENTOR(S) | : Scott L. Frederick and Ryan C. Harris | |

It is certified that error appears in the above-identified patent and that said Letters Patent is hereby corrected as shown below:

On the Title Page

Item (56), Foreign patent documents, delete "H091231327" and insert --H09123827--, therefor.

Signed and Sealed this
Ninth Day of July, 2019

Andrei Iancu
*Director of the United States Patent and Trademark Office*